(12) United States Patent
Hagnauer (10) Patent No.: US 10,247,325 B2
(45) Date of Patent: Apr. 2, 2019

(54) CONDENSATE DRAIN (71) Applicant: GEA Aseptomag AG, Kirchberg (CH)

(72) Inventor: Thomas Hagnauer, Thun (CH)

(73) Assignee: GEA Aseptomag AG, Kirchberg (CH)

( * ) Notice: Subject to any disclaimer, the term of this patent is extended or adjusted under 35 U.S.C. 154(b) by 0 days.

(21) Appl. No.: 15/023,202

(22) PCT Filed: Aug. 20, 2014

(86) PCT No.: PCT/EP2014/002285
§ 371 (c)(1),
(2) Date: Mar. 18, 2016

(87) PCT Pub. No.: WO2015/039724
PCT Pub. Date: Mar. 26, 2015

(65) Prior Publication Data
US 2016/0230903 A1 Aug. 11, 2016

(30) Foreign Application Priority Data
Sep. 19, 2013 (CH) ..................................... 01614/13

(51) Int. Cl.
*F16K 1/52* (2006.01)
*F16K 31/00* (2006.01)
(Continued)

(52) U.S. Cl.
CPC .............. *F16K 31/002* (2013.01); *F16K 1/52* (2013.01); *F16T 1/10* (2013.01); *F16T 1/386* (2013.01); *Y10T 137/8803* (2015.04)

(58) Field of Classification Search
CPC .......... F16K 31/002; F16K 31/12; F16K 1/52; F16K 15/18; F16T 1/10; F16T 1/386;
(Continued)

(56) References Cited

U.S. PATENT DOCUMENTS 1,050,210 A  *  1/1913  Gold .......................... F16T 1/10
                                                      236/58
1,548,900 A  *  8/1925  Parks ......................... F16T 1/10
                                                      137/183
(Continued)

FOREIGN PATENT DOCUMENTS

DE           689860 C     4/1940
DE           1751699 A1   8/1971
(Continued)

*Primary Examiner* — Craig J Price
*Assistant Examiner* — Andrew J Rost
(74) *Attorney, Agent, or Firm* — Young Basile Hanlon & MacFarlane, P.C.

(57) ABSTRACT

A condensate drain is described. The condensate drain comprises a thermodynamic actuator and a closing arrangement. The closing arrangement is configured to switch a fluid connection between a first connector and a second connector of the condensate drain in a thermodynamically controlled manner by the thermodynamic actuator. In order to achieve an improved cleaning capability, the condensate drain further comprises an adjusting device attached to the closing arrangement, wherein the adjusting device switches the fluid connection between the first connector and the second connector. A processing system simplified by the condensate drain is also described.

12 Claims, 10 Drawing Sheets (51) Int. Cl.
*F16T 1/10* (2006.01)
*F16T 1/38* (2006.01)

(58) Field of Classification Search
CPC ....... Y10T 137/6579; Y10T 137/88022; Y10T 137/8803; Y10T 137/88038; Y10T 137/88046
USPC ... 251/11, 82, 83, 62, 63.4, 14, 331, 95, 96; 236/54, 80 G, 100, 86; 137/614.11–614.2
See application file for complete search history.

(56) References Cited

U.S. PATENT DOCUMENTS

| | | | | |
|---|---|---|---|---|
| 1,792,891 A | * | 2/1931 | Clifford | F16K 17/383 236/93 A |
| 1,976,730 A | | 10/1934 | Irwin | |
| 2,495,226 A | * | 1/1950 | Crago | G05D 23/122 236/1 C |
| 2,882,007 A | * | 4/1959 | Conlan | 137/625.5 |
| 2,914,251 A | * | 11/1959 | Morgan | F16T 1/10 236/56 |
| 3,286,926 A | | 11/1966 | Domm et al. | |
| 3,351,282 A | | 11/1967 | Miyawaki | |
| 3,403,853 A | | 10/1968 | Monroe, Jr. | |
| 3,707,987 A | * | 1/1973 | Gordon | F16K 15/18 137/543 |
| 6,409,147 B1 | * | 6/2002 | Kenny | F16T 1/02 236/56 |
| 6,974,115 B2 | * | 12/2005 | Silva | F01C 21/10 251/30.01 |
| 8,191,794 B2 | * | 6/2012 | Sasaki | F01P 7/16 137/468 |
| 2011/0084222 A1 | * | 4/2011 | Vivian | F16T 1/14 251/61 |

FOREIGN PATENT DOCUMENTS

| | | |
|---|---|---|
| DE | 102011050955 A1 | 12/2012 |
| GB | 482058 A | 3/1938 |
| WO | 2012168221 A2 | 12/2012 |

* cited by examiner

CONDENSATE DRAIN

TECHNICAL FIELD

The invention relates to a condensate drain with a closing arrangement and a processing system simplified by the condensate drain.

BACKGROUND

In industries with high hygienic requirements, for example the food industry, the processing systems must be cleaned on a regular basis.

In a first phase of the cleaning, the processing system is rinsed with water, lye and acid, wherein lye and acid can be in a temperature range between 60° C. and 95° C. A sufficiently large fluid throughput is sought in all system parts. In this phase, it is referred to as CIP, "cleaning in place."

In a second phase of the cleaning, the processing system is sterilized, which is referred to as SIP, "sterilization in place." Reduced use of sterilizing chemicals is sought. Water steam is used, which is directed through the processing system under defined pressure and temperature conditions as saturated steam, for example, in a temperature range of 125° C. to 145° C. at a pressure of 2.3 bar to 3.1 bar. These conditions must be followed precisely. However, this is made more difficult because the processing system itself has a temperature distribution. For example, the processing system has cold sections where the condensation of steam results.

This condensate in the processing system is problematic for the sterilization process. The total energy demand increases through the condensate because the condensate must again be heated above the boiling point and/or new steam must be created to replace the condensed steam. The processing system, therefore, may not be freed of contaminants, e.g. bacteria in the area of the condensate. Thus, the condensate must be removed from the processing system with the help of a condensate drain.

German Patent No. DE 689 860 introduces a condensate drain for the chemical industry. It comprises a closing arrangement, which works together with an expansion body, which has a bellows. The bellows is filled with an easily boiling liquid. Through the heating via the bellows and the cover, gas and liquid expand, whereby the bellows expands in its axial direction. A closing cone is brought into sealing contact with a valve seat. If there is condensate in the condensate drain, the bellows is cooled so that gas and liquid contract in its interior. As a result, the bellows also contracts so that the closing member is raised from the valve seat and the condensate can flow out of the condensate drain.

German Patent Application No. DE 10 211 050 955 A1 shows a newer approach. In the condensate drain, the expansion body is completely foregone. In its place, the closing member is shifted by a pneumatic drive. The drive is driven by a control electronics, which reacts to temperature measurement values, which are raised in the interior of the condensate drain.

SUMMARY

Regardless of the used shifting principle, the condensate drains have in common that the cross-section of the outlet in the open position of the drain is as small as possible. The drainage of the liquid should be achieved without lowering of the steam pressure with respect to the temperature.

In the processing system, a condensate drain according to prior art is installed in a branch line, wherein a valve is generally provided between the processing system and the condensate drain, with which this line can be switched over to a discharge line leading to a disposal device. Another valve can be provided, with which the discharge line can be blocked.

An object of the invention is to create a condensate drain that can be cleaned better. A simplification of the processing system is also achieved by the condensate drain.

This object is solved by a condensate drain and a processing system with characteristics described herein.

The condensate drain according to the teachings herein has a closing arrangement with a thermodynamic actuator so that a fluid connection is switchable in a thermodynamically controlled manner between a first connector and a second connector of the condensate drain. The condensate drain is characterized in that an adjusting device is connected to the closing arrangement, under the action of which the fluid connection is also switchable. The thermodynamic actuator effectuates a switching depending on the pressure and temperature ratios inside the condensate drain, resulting in a very simple and precise drainage of the condensate. The adjusting device also makes it possible to switch the fluid connection independently of the thermodynamic conditions. In particular, the adjusting device allows the closing arrangement to move into a better cleaning position, thereby preventing contaminants to collect in the condensate drain. For example, contaminants will not collect in the tight crevices that are desirable for the condensate drain function. In addition, expensive disassembly work is foregone. An adjusting device also allows the creation of a switch path of the closing arrangement that is larger than the switch path created by the thermodynamic actuator. Thus, a valve can be created in a technically simple and cost effective manner, which has greater fluid throughputs during switching by adjusting device than during thermodynamic switching.

According to a further development, the adjusting device is designed as a shifting device. A straight-line movement is effectuated, which advantageously prevents torsional moments arising from rotational movements from being introduced into the closing arrangement and in particular the thermodynamic actuator.

According to a further development, the adjusting device is designed in a pressurizing medium operable manner, in particular pneumatically, which means a cost-effective and secure structure.

It is advantageous for the process of the cleaning of the processing system to hold the condensate drain closed independently of the function of the thermodynamic actuator, for example, during the heating to the base temperature for the SIP phase. Thus, an advantageous further development is a shifting device that compensates for the effect of the thermodynamic actuator such that the closing arrangement is located in a closed position for interrupting the fluid connection, independently of the contraction or expansion of the thermodynamic actuator.

A cost-effective design of the thermodynamic actuator that can be adjusted very precisely for the thermodynamic requirements for the desired function comprises a bellows filled with a fluid.

A further development of the thermodynamic actuator designed as a bellows provides to arrange within the bellows a guide means, which restricts the contraction of the bellows along an axial direction and thereby prevents the deflection in the radial direction. This prevents a gap formation between the closing arrangement and the valve seat, which can occur through deflection of the bellows out of its target position. It also prevents an overexpansion of the bellows with corresponding material stress.

According to an advantageous further development, the guide means has a rod, which is arranged telescopically movable in a hollow rod. This is a more cost-effective, easier and more easily producible structure of the guide means. Moreover, it allows a central arrangement within the bellows and a small structure in comparison with the bellows volume, whereby the influence on the thermodynamic behavior of the actuator is held low.

According to an advantageous design, the thermodynamic actuator comprises a capsule filled with a fluid, which is expandable in an axial direction through the effect of the fluid. Through this design, bellows folding is foregone, which reduces contaminants of the condensate drain in processing systems, in which fragmented products are processed.

A further development of the design with a capsule provides to provide a passage in the closing arrangement, which is controllable by the thermodynamic actuator. This permits, in a simple manner, the creation of the passage with another, preferably smaller, passage surface than the passage controlled by the adjusting device.

In another development, a mixture of ethanol and water is provided as the fluid filled in the thermodynamic actuator. This is advantageous, cost-effective relating to hygiene and sterility in the case of any damage occurring to the actuator and the thermodynamic behavior is easily adjustable in a broad range.

In a further development, a switch rod is located between the closing arrangement and the adjusting device, which has a constriction. In the area of the constriction, the switch rod has a reduced cross-section so that the heat conduction is reduced. This measure reduces the heat coupling and thus the impact of the thermodynamic behavior of the thermodynamic actuator. For example, heat coupling is reduced through the parts of the switch rod coming in contact with process fluid.

According to a further development, a metallically sealing interaction of the closing arrangement and the valve seat is suggested. This is advantageously well cleanable, avoids spots where bacteria can collect and is cost-effective. Moreover, it is also permanently suitable for high temperatures.

According to yet another development, the thermodymanic actuator, together with the adjusting device, releases the opening of a passage surface, which is larger than the passage surface. In the condensate drain function, it is desirable to release a gap or a small passage, while it is desirable in other phases of the cleaning process to achieve high throughputs through the condensate drain. According to this further development, clear differences in the passage surfaces are advantageously presentable in a simple and cost-effective manner.

The processing system has a condensate drain, which is arranged between a pipeline arrangement and a disposal device. Pipeline sections and additional valves for the controlled bypassing of the condensate drain through the processing system according to the invention are advantageously unnecessary and can be omitted. If the condensate drain is further developed such that it can be brought into a closed position independently of the thermodynamic actuator, it is unnecessary to provide a shutoff valve between the pipeline arrangement and the condensate drain, which can thus also be economized. The processing system with the condensate drain according to the invention is thus cost-effective, space-saving and has a reduced number of parts to be cleaned.

An additional improvement of the processing system is achieved in that, according to a further development, a temperature sensor is provided in the interior of the processing system or is connected with it and a control device connected with the temperature sensor is provided. The control device for controlling the adjusting device is thereby set up depending on the signal of the temperature sensor. This advantageously allows the control of the change from the thermodynamic operation of the condensate drain for condensate drainage to operation with the adjusting device according to purely thermal considerations.

DETAILED DESCRIPTION

Figure 1:
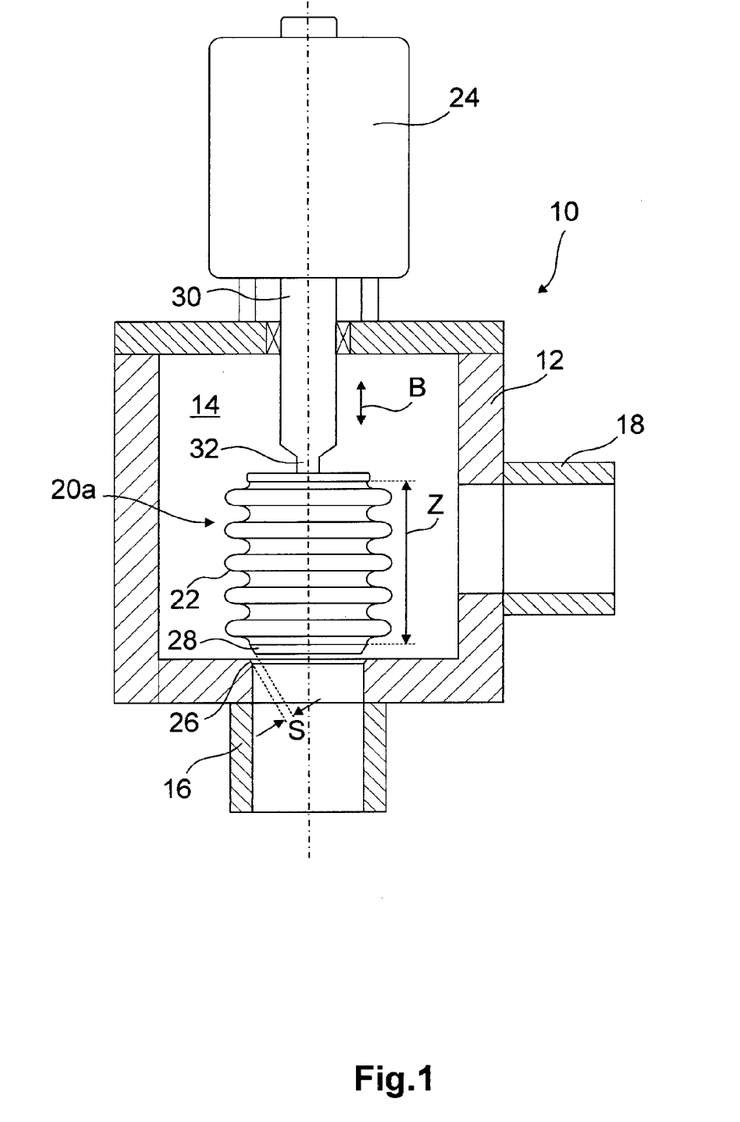
FIG. 1 shows a partial longitudinal cut through a condensate drain with the thermodynamic actuator in a position, in which the condensate can be drained.
Figure 2:
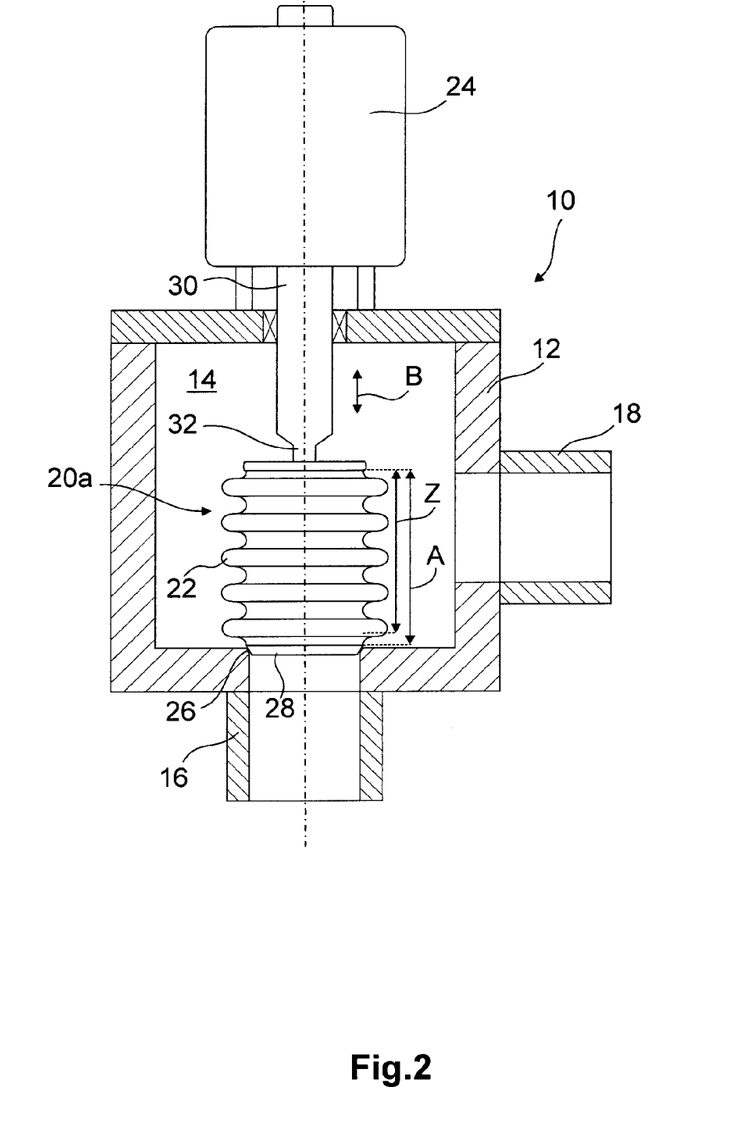
FIG. 2 shows a partial longitudinal cut through a condensate drain with the thermodynamic actuator in a closed position, which is effectuated through expansion of the thermodynamic actuator.
Figure 3:
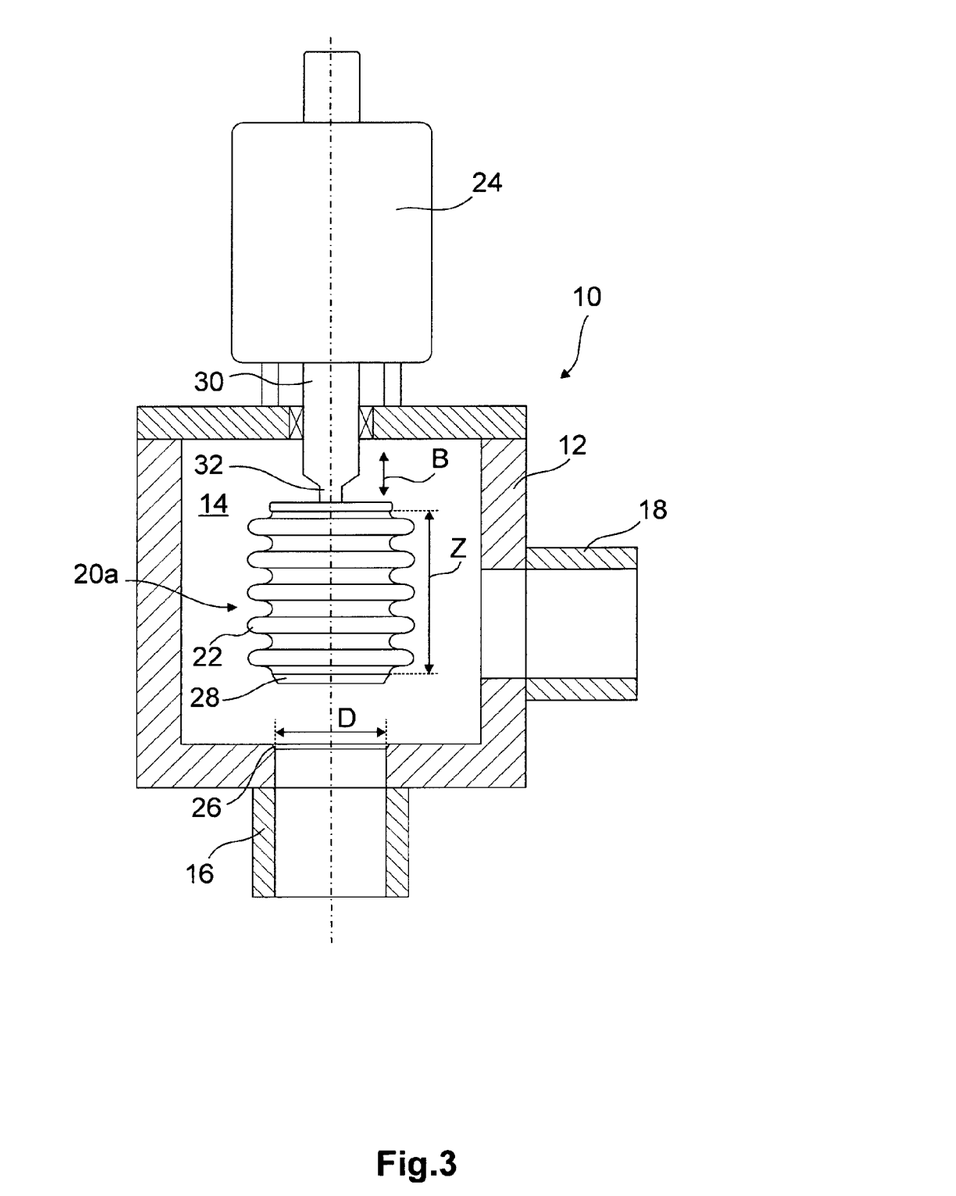
FIG. 3 shows a partial longitudinal cut through of a condensate drain with the thermodynamic actuator, which is adjusted by an adjusting device in order to release a large outlet cross-section.

The illustrations FIG. 1, FIG. 2 and FIG. 3 show a condensate drain 10 in a representation partially cut along a longitudinal axis in three different switch positions. If not specified otherwise, the same reference numbers are used for the same objects in the figures.

The housing 12 surrounds an interior 14. A first connector 16 and a second connector 18, through which the interior 14 for process fluids is accessible, are arranged on the housing 12. The first connector 16 and the second connector 18 are designed connectible with a processing system and are welded, for example, with pipes of the processing system if the condensate drain 10 is installed in it.

A closing arrangement 20a is set up to switch a fluid connection between a first connector 16 and a second connector 18 and is located within the interior 14. The closing arrangement 20a comprises a thermodynamic actuator, which has a bellows 22 according to an embodiment.

A valve seat 26 surrounds an opening with which the first connector 16 flows into the interior 14. A valve plate 28 is arranged on the bellows 22 of the closing arrangement 20a and works with the valve seat 26.

The bellows 22 is filled with a fluid, the volume of which depends on the temperature and the ambient pressure acting on the bellows 22. This fluid can be a mixture with alcohol and water, preferably ethanol and water, as main components. The volume of the fluid in the bellows 22 depends on the thermodynamic conditions in the interior 14 and determines its expansion along the direction perpendicular to bellows folds. If condensate is in the interior 14, the mix ratio and the positioning of the closing arrangement 20a within the interior 14 are measured such that, the bellows 22 contracts to a contracted length Z. Through the implementation of the valve plate 28 as an element closing the front surface of the bellows 22, the bellows 22 and thus the thermodynamic actuator is arranged near the first connector 16 and advantageously dips into the condensate already in the case of small condensate quantities in the interior 14. This effectuates an advantageous thermodynamic switch behavior.

As shown in FIG. 1, a gap width S is formed between the valve seat 26 and the valve plate 28 when the bellows 22 is contracted length Z. The gap width S is preferably dimensioned so that liquid condensate from the interior 14 flows out without creating a critical gas flow through the first connector 16. A gas flow is critical when, through gas escaping together with the condensate, the pressure in the interior 14 and in the pipeline system of the processing system falls below the values necessary to maintain the SIP conditions.

As soon as the condensate has drained from the interior 14 through the first connector 16, the thermodynamic conditions in the interior 14 are such that the fluid in the bellows 22 expands. In particular, the bellows 22 and the fluid contained therein are heated when the closing arrangement 20a is no longer in contact with condensate.

FIG. 2 shows that the bellows 22 has expanded to an expanded length A through heating after drainage of the condensate. Through this expansion, valve seat 26 and valve plate 28 come into contact with each other, whereby the fluid connection of the interior 14 and the first connector 16 is interrupted. Condensate and gas can no longer escape from the condensate drain 10 through the first connector 16. The contact between the valve seat 26 and the valve plate 28 is advantageously designed metallically. The cleanability and thermal capacity of the condensate drain 10 are considerably increased.

In particular, through the described design of the bellows 22, selection of the fluid in the bellows 22 and the positioning of the closing arrangement 20a in the interior 14 of the condensate drain 10, the closing arrangement 20a is configured for switching a fluid connection between the first connector 16 and the second connector 18 in a thermodynamically controlled manner.

The condensate drain 10 has an adjusting device 24 connected with the housing 12. This is connected with the closing arrangement 20a by a switch rod 30 fed through the housing 12 in a sealed manner. The adjusting device 24 effectuates a shifting of the switch rod 30 and thus the closing arrangement 20a along a movement direction B.

FIG. 3 shows that the closing arrangement 20a pulled back into the interior 14 deep along the movement direction B under the action of the adjusting device 24 in order to create an open position. The valve seat 26 and the valve plate 28 are spaced in this position far enough apart that the complete free diameter D of the valve seat 26 is used to establish a fluid connection between the first connector 16 and the second connector 18 through the interior 14.

The contracted length Z and the expanded length A of the bellows 22 as well as the travel effectuated by the adjusting device 24 are dimensioned such that the valve seat 26 and the valve plate 28 in the switch position of the condensate drain 10 according to FIG. 3 have such a large distance that the complete free diameter D is used for the fluid connection. In this manner, the closing arrangement 20a is configured for switching the fluid connection under the action of the adjusting device 24.

It is advantageous to provide the switch rod 30 with a constriction 32 shown in FIG. 1 to FIG. 3. This constriction 32 reduces a thermal coupling of the closing arrangement 20a to the switch rod 30 and adjusting device 24. By reducing the impact of the switch rod 30 and adjusting device 24, the thermodynamic switch behavior of the bellows 22 is very precisely adjustable and is determined by the thermodynamic conditions in the interior 14.

Figure 4:
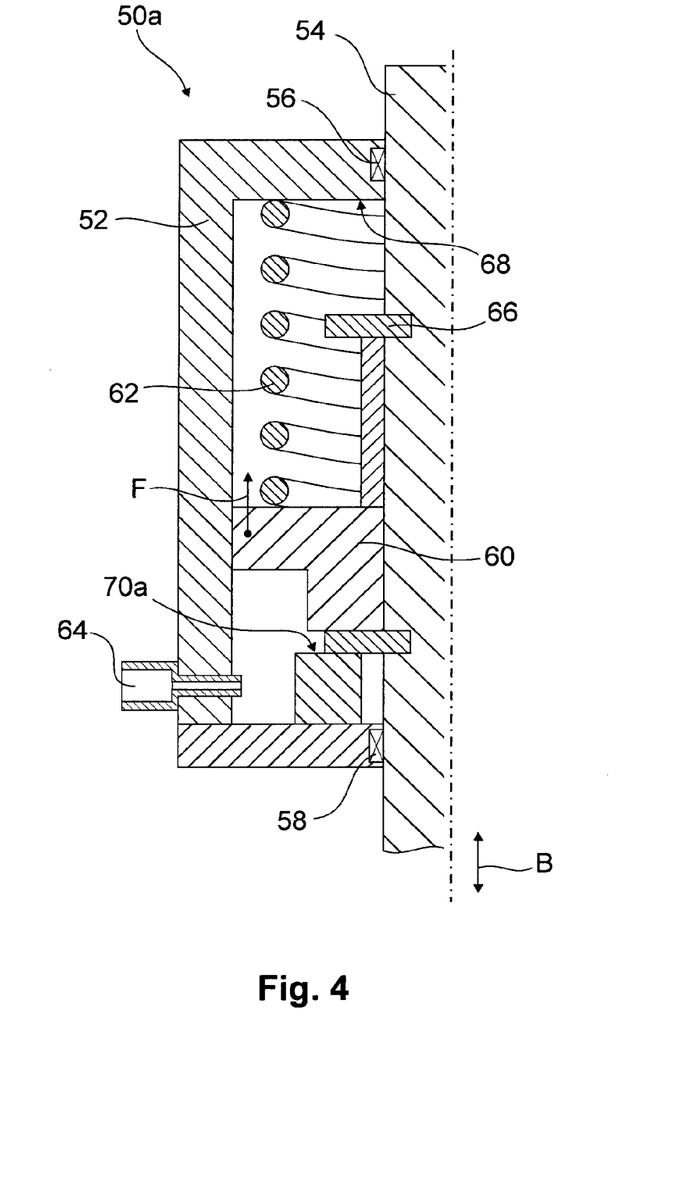
FIG. 4 shows a longitudinal cut through an adjusting device designed as a shifting device.
Figure 5:
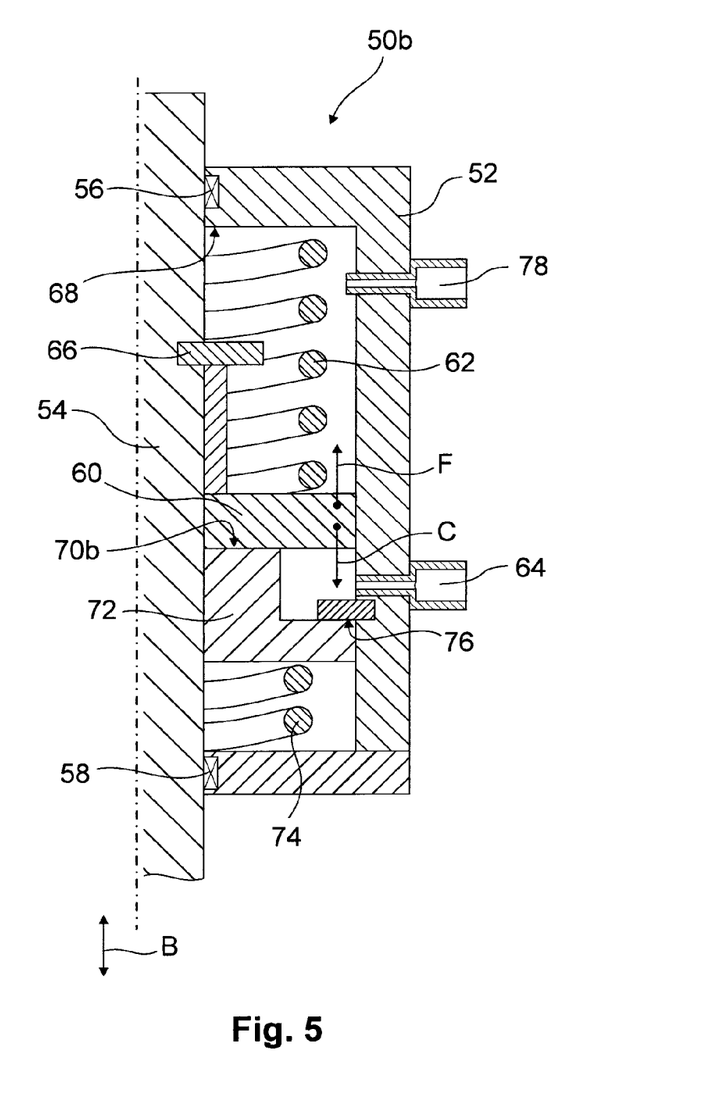
FIG. 5 shows a longitudinal cut through of the shifting device according to an embodiment.

A cut through a design of the adjusting device 24 in the form of a shifting device is shown in FIG. 4. FIG. 5 shows a further embodiment of this shifting device.

A shifting device 50a in FIG. 4 comprises a pressure-tight reservoir 52. It is penetrated by a drive rod 54, which is sealed at the passage spots with an upper seal 56 and a lower seal 58. The drive rod 54 is movable along the movement direction B and transitions into the switch rod 30 in FIG. 1 to FIG. 3 on the lower end of FIG. 4 and FIG. 5 or is connected with it.

A plunger 60 is permanently connected with the drive rod 54, for example by a form-, force- or surface-connected connection. A spring 62 is supported on the reservoir 52 on one side and on the plunger 60 on the other side. A first pressurizing medium connection 64 is arranged such that pressurizing medium can be let into the reservoir 52, which moves the plunger 60 in an opening direction F against the force of the spring 62. This movement is restricted if a stopper 66 connected with the drive rod 54 or formed on it or plunger 60 comes in contact with a reservoir-side first stop 68. Through this movement, the closing arrangement 20a is brought into the open position according to FIG. 3.

If the shifting device 50a is not supplied with pressurizing medium the force of the spring 62 pushes the plunger 60 opposite the opening direction F against a second stop 70a. It is dimensioned such that the closing arrangement 20a is located in the position according to FIG. 1 and FIG. 2, in which the fluid connection between the first connector 16 and the second connector 18 is thermodynamically switched through the effect of the bellows 22.

The shifting device 50a can be further developed according to FIG. 5, in which it is labeled as a shifting device 50b. The parts of the shifting device 50b provided with the same reference numbers corresponding in their action with the parts explained based on FIG. 4.

The shifting device 50b also has a counter plunger 72, through which an additional functionality of the adjusting device 24 results. A counter spring 74 is supported on the reservoir 52 and on the counter plunger 72. It effectuates a force, which pushes the counter plunger 72 against a reservoir-side counter plunger stop 76. The second stop 70b, against which the plunger 60 is pressed under the force of the spring 62, is arranged on the counter plunger 72, in order to position the closing arrangement 20a in the position according to FIG. 1 and FIG. 2.

In order to take advantage of the additional functionality, a second pressurizing medium connection 78 allows the supply of pressurizing means into the reservoir 52 such that the force of the spring 62 is supported and the plunger 60 is pressed against the counter plunger 72 and the force of the counter spring 74 so that the plunger 60 and the counter plunger 72 move in closing direction C. The forces of the spring 62 and the counter spring 74 are thereby configured such that a force acts on the closing arrangement 20a during supply with pressurizing medium through the second pressurizing medium connection 78, which holds the valve seat 26 and the valve plate 28 in sealing contact with each other independently of the action of the thermodynamic actuator, of the bellows 22. The condensate drain 10 is thus located independently of the thermodynamic conditions in its interior 14 and the processing system in a permanently closed position.

Figure 6:
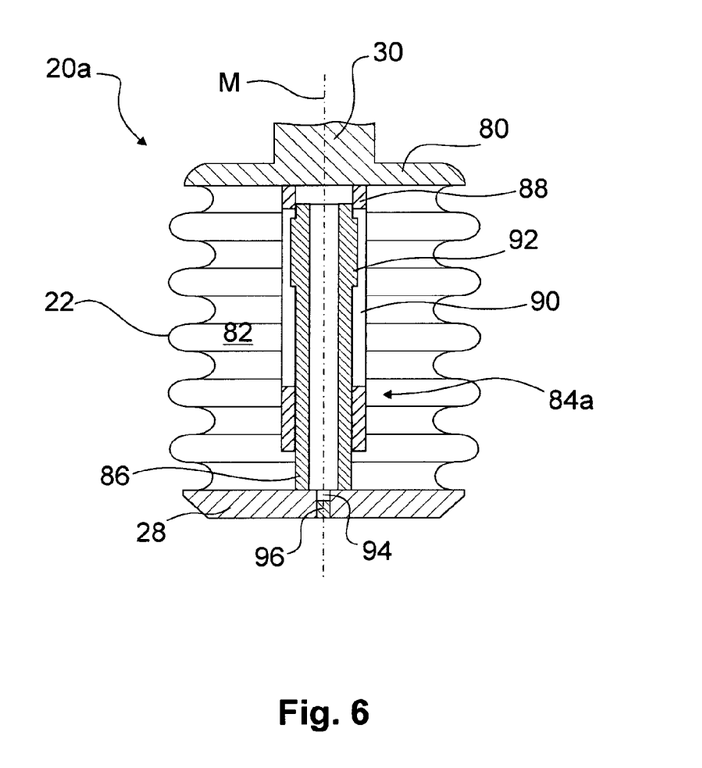
FIG. 6 shows a longitudinal cut through of a closing arrangement with a thermodynamic actuator with guiding arrangement.

FIG. 6 shows a longitudinal cut through of the closing arrangement 20a. The front sides of the bellows 22 are connected with a cover 80 and the valve plate 28 in a sealed manner. The cover 80 is in turn connected with the switch rod 30. The shown design offers easy producibility because the bellows fold respectively attached to the cover 80 and the valve plate 28 transitions bent radially outwards into the cover 80 or respectively the valve plate 28. The bellows 22, the cover 80 and the valve plate 28 surround a bellows interior 82.

A guide means 84a is arranged in the bellows interior 82, preferably near the symmetrical axis M of the mainly rotationally symmetrical bellows 22. This comprises a rod 86, which is connected with the valve plate 28. The rod 86 is located in a hollow rod 88. Both rods 86 and 88 are designed such that the rod 86 slides telescopically in the hollow rod 88. A radial deflection of the valve plate is prevented with respect to the cover 80. In another embodiment, the hollow rod 88 has at least one longitudinal slit 90, in which an elevation 92 provided on the rod 86 slides. The longitudinal slit 90 has a restricted expansion in the direction of the symmetrical axis M, so that the elevation 92 is shiftable only over this expansion of the longitudinal slit 90. The expansion of the bellows 22 in the direction of the symmetrical axis M and thus the minimum and maximum distance of the cover 80 and the valve plate 28 with respect to each other are restricted. Overexpansion or excess compression of the bellows 22 is avoided in this manner. The longitudinal slit 90 is configured such that the bellows 22 reaches the contracted length Z necessary for the function of the condensate drain 10 and expanded length A. The centrally arranged guide means 84a allows a thin-walled bellows 22 so that a good and thereby fast heat transfer from the interior 14 of the condensate drain 10 to the fluid inside the bellows interior 82 takes place.

The valve plate 28 can have an inlet hole 94, through which the bellows interior 82 can be filled with fluid. The inlet hole 94 is sealed in a fluid-tight manner after the filling of the bellows interior 82 with a plug 96. The rod 86 is also designed in a hollow manner and forms a fluid channel with the inlet hole 94.

Figure 7:
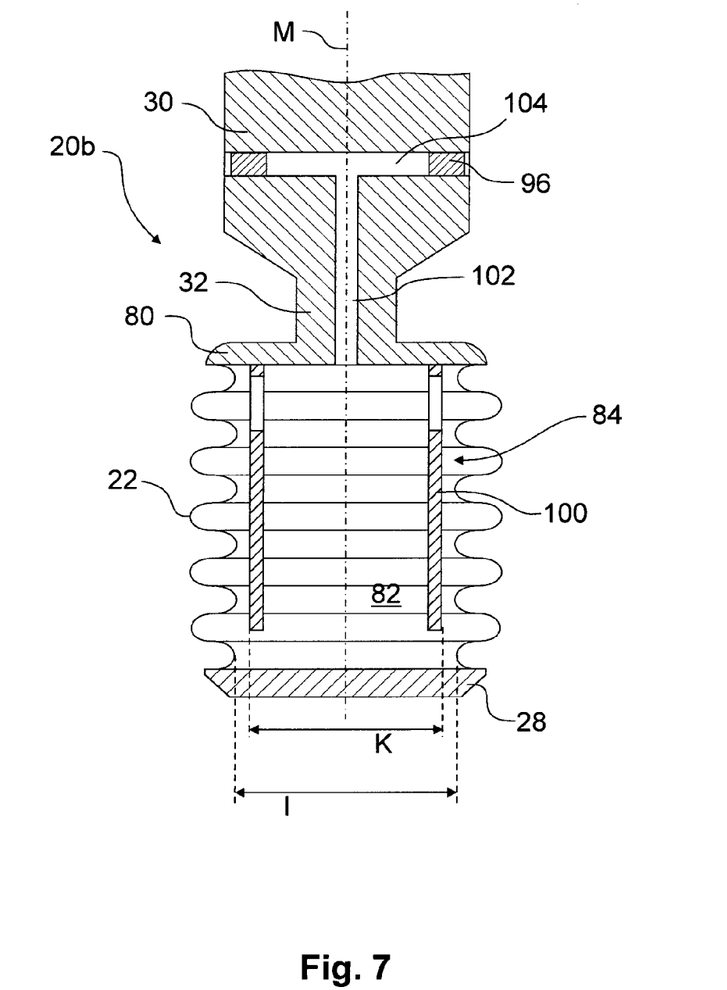
FIG. 7 shows a longitudinal cut through of a closing arrangement with a thermodynamic actuator in an embodiment of the guiding arrangement.

FIG. 7 shows an alternative embodiment of the closing arrangement with the help of a longitudinal cut through the closing arrangement 20b. The closing arrangement 20b also has the bellows 22 arranged between the cover 80 and the valve plate 28, which together delimit the bellows interior 82. A cage 100 arranged in the bellows interior 82 serves as a guide means 84. It has an outer diameter cage K, which lies so close to the inner diameter I of the bellows 22 that the possible shifts of the bellows 22 in the radial direction and thus the deflection of the valve plate 28 with respect to the cover 80 are so small that the function of the condensate drain 10 is ensured. The axial expansion of the cage 100 restricts the compression of the bellows 22. This design of the guide means 84 is structured in a simple manner by omitting parts that slide in each other.

The filling of the bellows interior 82 takes place in the closing arrangement 20b through an inlet channel 102, which penetrates the constriction 32 of the switch rod 30 in the axial direction and flows into a transverse hole 104. The transverse hole 104 is sealed with a corresponding number of plugs 96.

Figure 8:
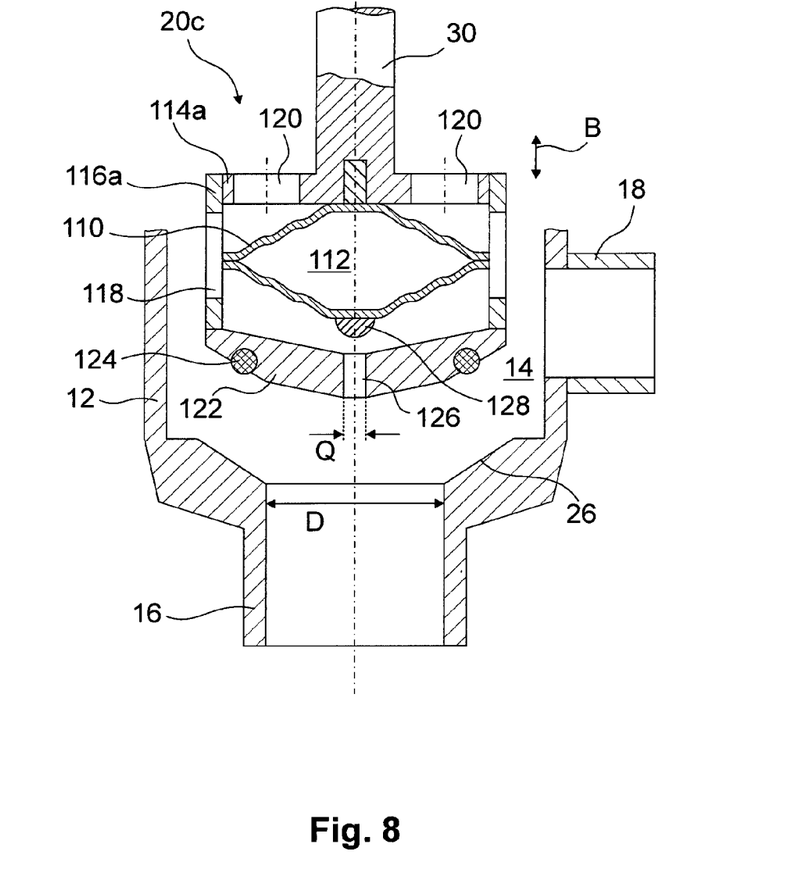
FIG. 8 shows a longitudinal cut through a condensate drain with an alternatively designed thermodynamic actuator.

FIG. 8 shows a condensate drain 10 with a further embodiment of a closing arrangement 20c in cross-section.

The thermodynamic actuator is designed in this embodiment as a pressure-tight closed capsule 110. The capsule 110 is shaped from two profiled steel sheets, which are interconnected, for example welded, in a sealed manner on their outer edges. A fluid, the volume of which depends on the thermodynamic conditions in the interior 14 of the housing 12 of the condensate drain 10, is located in the capsule interior 112. The profiling of the steel sheets is selected such that a volume increase effectuates the expansion of the capsule 110 in the direction of the movement direction B of the closing arrangement 20c.

The capsule 110 is connected with a supporting structure 114a, which is connected to the switch rod 30, which can have a constriction 32. The supporting structure 114a is provided with a support 116a, which has at least one lateral opening 118, through which process fluid from the interior 14 gets into the capsule 110. The supporting structure 114a has upper openings 120, which also make the capsule surface accessible for process fluid from the interior 14.

The support 116a surrounds the capsule 110 and is connected with a closing element 122, which works together with the valve seat 26 and a closing seal 124.

The closing element 122 has a passage 126, which is arranged such that a closer 128 arranged on the capsule 110 closes the passage 126 when the capsule 110 is expanded.

FIG. 8 shows the capsule 110 in the contracted state for better clarity. The closing element 122 is simultaneously raised from the valve seat 26. In particular, the functions described below are taken advantage of during the operation of the condensate drain 10 in a processing system.

The capsule 110 of the closing arrangement 20c contracts under the desired thermodynamic conditions in the interior 14, for example when liquid condensate is present there. The closer 128 is lifted and releases the passage 126. In the condensate drain function, the closing element 122 is simultaneously in sealing contact with the valve seat 26. In this manner, the condensate is removed from only the interior 14 into the first connector 16 through a passage cross-section Q that is small compared to the free opening of the valve seat D of the valve seat 26. The passage cross-section is thereby dimensioned such that a maximum pressure reduction occurs in the interior 14, which does not fall short of the limits of temperature and pressure set by the process in the interior 14 and the processing system. After the desired drainage of the condensate, the capsule 110 expands and the closer 128 comes in sealing contact with the opening of the passage 126 so that it is sealed closed. Through this functionality, the closing arrangement 20c is configured for switching the fluid connection between the first connector 16 and the second connector 18 in a thermodynamically controlled manner.

The closing arrangement 20c is movable along the movement direction B by the switch rod 30. In particular, the closing arrangement 20c can be raised so that the sealing contact of the closing element 122 and the closing seal 124 with the valve seat 26 is separated. This raising is effectuated by an adjusting device 24 connected with the switch rod 30. In the raised state of the closing arrangement 20c, a fluid connection between the first connector 16 and the second connector 18 is released, wherein the full free opening of the valve seat D of the valve seat 26 is available for fluid transport. In the course of the switching under the action of the adjusting device 24, high fluid throughputs through the condensate drain 10 are possible, which is for example advantageous in the CIP phase.

The capsule 110 is connected for example with the supporting structure 114a. Alternatively, it is fastened directly or indirectly, for example with a mounting bracket, on the supporting structure 114a, on the support 116b or on the closing element 122. A distance is provided between the capsule 110, in particular the closer 128, and the closing element 122, which permits the sealing of the passage 126 by the closer 128 when the capsule 110 expands.

The design according to FIG. 8 offers the advantage that the dimensions of the passage cross-section Q and free opening of the valve seat D determining the fluid throughput in both basic functions of the condensate drain 10, the thermodynamic controlled switching and the switching effectuated by the adjusting device 24 is mainly selected independently of each other.

Figure 9:
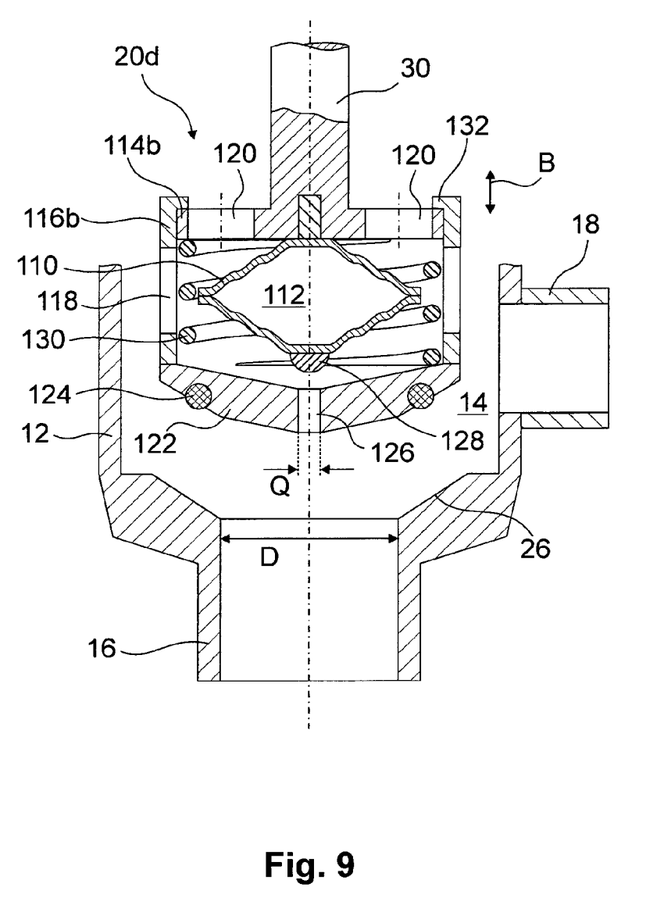
FIG. 9 shows a longitudinal cut through of a condensate drain according to an embodiment.

FIG. 9 shows a further embodiment of the condensate drain 10 with capsule 110. The closing arrangement 20d is designed in this embodiment such that the capsule 110 is effected as the thermodynamic actuator is balanced by the shifting device 50b. In other words, the closing arrangement 20d is configured such that the closer 128 can close the passage 126 and the closing element 122 through sealing contact with the valve seat 26, the first connector 16 permanently under the action of the shifting device 50b. This occurs independently of the thermodynamically caused deformation of the capsule 110. This property of the closing arrangement 20d is achieved through the characteristics described below that deviate from FIG. 8.

In contrast to the embodiment according to FIG. 8, the supporting structure 114b and the support 116b in the embodiment according to FIG. 9 are not permanently interconnected. The supporting structure 114b and the support 116b are designed shiftable against each other along the movement direction B. The distance between the supporting structure 114b and the closing element 122 is changeable; it can be reduced. An elastic element is located between the supporting structure 114b and the closing element 122. For example, a closing arrangement spring 130 is designed such that the supporting structure 114b and the closing element 122 are pushed away from each other along the movement direction B. The movement away from each other is restricted by a flange 132 provided on the support 116b, which reaches in the radial direction inwards over the supporting structure 114b.

If it is desirable through the process operated in the processing system to close the condensate drain 10 permanently, a force is exerted by the switch rod 30 and the supporting structure 114b, which effectuates a sealing contact of the closing element 122 and the valve seat 26 and also pushes together the closing arrangement spring 130. The supporting structure 114b and the capsule 110 fastened on it are moved so far in the direction of the closing element 122 that the closer 128 closes the passage 126 in a sealing manner. In this manner, both openings of the condensate drain 10 are sealed tight and no fluid flow can take place between the first connector 16 and the second connector 18.

In FIG. 9, the capsule 110 is shown connected with the supporting structure 114b. The capsule 110 can be arranged in alternative designs, wherein the capsule 110 is respectively applied in the closing arrangement 20d such that the closer 128 in the contracted state of the capsule 110 releases the passage 126 and closes it when the capsule 110 is expanded. For this, the capsule 110 is fastened directly or indirectly, for example, with a mounting bracket on another part of the closing arrangement 20d, for example, on the supporting structure 114b or on the closing element 122. The fastening is designed flexibly when fastening on the closing element 122. The flexibility is designed that through the introduction of a force by the switch rod 30, the capsule 110 can be moved far enough onto the closing element 122 that the closer 128 closes the passage 126.

Within the capsule 110, a guide means 84a/84 like in the examples according to FIG. 6 and FIG. 7, respectively, can be arranged in both designs according to FIG. 8 and FIG. 9. In particular, it is arranged in order to prevent too strong of a compression of the capsule 110. The overexpansion is prevented by a correspondingly selected axial length of the support 116a/116b.

Figure 10:
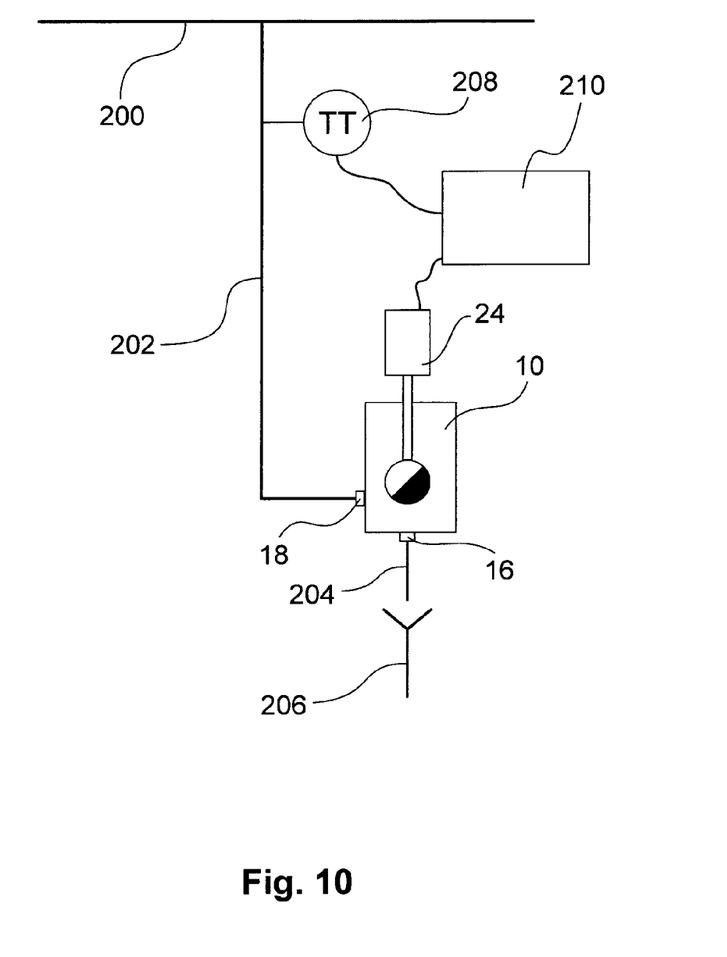
FIG. 10 shows a schematic representation of a processing system with a condensate drain.

FIG. 10 shows in a schematic representation a processing system. A condensate drain 10 with the previously explained design characteristics is installed in it.

The processing system has a pipeline arrangement 200, from which a condensate line 202 branches. The condensate drain 10 is arranged in it, for example, in that the second connector 18 is connected with the condensate line 202. The first connector 16 of the condensate drain 10 is connected with a drain line 204. This drain line 204 establishes a fluid connection from the condensate drain 10 to a disposal device 206, which is configured to dispose of contaminated fluid and cleaning agents from the CIP/SIP process.

During the operation of the condensate drain 10 as a thermodynamically controlled switch, the closing arrangement 20a, 20b, 20c, 20d of the condensate drain 10 are located in the position according to FIG. 1, so that the condensate drain 10 opens far enough during the occurrence of condensate in its interior 14 that condensate is fed to the disposal device 206. This corresponds with the SIP phase, the sterilization phase with water steam.

In the CIP phase, in which the pipeline arrangement 200 of the processing system and the process components connected with it are cleaned with lies and/or acids, the closing arrangement 20a, 20b, 20c, 20d of the condensate drain 10 is brought into the permanent open position by the adjusting device 24, see for example FIG. 3. The used fluids of the CIP process are fed to the disposal device 206.

The SIP phase can be performed only after exceeding a lower threshold temperature within the processing system. Thus, in a further embodiment, a temperature sensor 208 is connected with the process piping in order to monitor the temperature within the processing system. In one embodiment, the process piping is the condensate line 202. The monitoring occurs automatically in a control device 210. When the threshold temperature is exceeded, the control device 210 effectuates a switching of the adjusting device 24 and the closing arrangement 20a, 20b, 20c, 20d of the condensate drain 10 into a position, in which it acts as a thermodynamically controlled switch unit.

The need for a bridging line with corresponding valves, with which the condensate drain 10 must be bridged in the prior art, is advantageously omitted in the processing system shown in FIG. 10. Moreover, it is unnecessary to provide a valve for separating the condensate drain 10 from the pipeline arrangement 200 between the pipeline arrangement 200 and the condensate drain 10.

A list of reference numbers used are as follows.
10 Condensate drain
12 Housing
14 Interior
16 First connector
18 Second connector
20a, 20b, 20c, 20d Closing arrangement
22 Bellows
24 Adjusting device
26 Valve seat
28 Valve plate
30 Switch rod
32 Constriction
50a Shifting device
50b Shifting device
52 Reservoir
54 Drive rod
56 Upper seal
58 Lower seal
60 Plunger
62 Spring
64 First pressurizing medium connection
66 Stopper
68 First stop (open position)
70a Second stop (elevated position)
70b Second stop (elevated position)
72 Counter plunger
74 Counter spring
76 Counter plunger stop
78 Second pressurizing medium connection
80 Cover
82 Bellows interior
84 Guide means
86 Rod
88 Hollow rod
90 Longitudinal slit
92 Elevation
94 Inlet hole
96 Plug
100 Cage
102 Inlet channel
104 Transverse hole
110 Capsule
112 Capsule interior
114a, 114b Supporting structure
116a, 116b Support
118 Lateral opening
120 Upper opening
122 Closing element
124 Closing seal
126 Passage
128 Closer
130 Closing arrangement spring
132 Flange
200 Pipeline arrangement
202 Condensate line
204 Drain line
206 Disposal device
208 Temperature sensor
210 Control device
B Movement direction
Z Contracted length
A Expanded length
S Gap width
D Free opening of the valve seat
F Opening direction
C Closing direction
M Symmetrical axis
I Inner diameter
K Outer diameter cage
Q Passage cross-section

The invention claimed is:

1. A condensate drain, comprising:
a thermodynamic actuator;
a closing arrangement for switching a fluid connection between a first connector and a second connector of the condensate drain in a thermodynamically controlled manner under the action of the thermodynamic actuator; and
an adjusting device connected with the closing arrangement, wherein:
the closing arrangement is set up for switching the fluid connection under action of the adjusting device,
the adjusting device is designed as a shifting device for effectuating a straight-line movement, and
the adjusting device is arranged to exert a force directly onto the thermodynamic actuator to interrupt the fluid connection in a permanently closed position,
wherein a larger passage surface is released through switching by the adjusting device than through switching by the thermodynamic actuator.

2. The condensate drain according to claim 1, wherein the adjusting device is designed in a pressurizing-medium-operable manner.

3. The condensate drain according to claim 1, wherein the thermodynamic actuator comprises a bellows filled with a fluid.

4. The condensate drain according to claim 3, further comprising:
a guide means arranged within the bellows, which restricts contraction of the bellows in an axial direction and shifts contraction of the bellows in a radial direction.

5. The condensate drain according to claim 4, wherein the guide means comprises a rod arranged in a hollow rod in a telescopically movable manner.

6. The condensate drain according to claim 1, wherein the thermodynamic actuator comprises a capsule filled with a fluid, wherein the capsule is expandable in an axial direction through action of the fluid.

7. The condensate drain according to claim 3, wherein the fluid comprises water and ethanol.

8. The condensate drain according to claim 6, wherein the closing arrangement has a closable passage, which is controllable by the thermodynamic actuator.

9. The condensate drain according to claim 1, further comprising:
a switch rod, which has a constriction for reducing thermal conduction, provided between the adjusting device and the closing arrangement.

10. The condensate drain according to claim 1, wherein the closing arrangement works together with a valve seat in a metallically sealing manner.

11. A processing system with a pipeline arrangement, wherein the condensate drain according to claim 1 is arranged proximate the pipeline arrangement.

12. The processing system according to claim 11, further comprising:
a temperature sensor in an interior or connected to an exterior of the processing system wherein the adjusting device is controlled based on a signal of the temperature sensor.

* * * * *